United States Patent [19]

Jonas et al.

[11] Patent Number: 4,913,063
[45] Date of Patent: Apr. 3, 1990

[54] THERMOSTABLE IRON OXIDE PIGMENTS, PROCESSES FOR THEIR PREPARATION AND THEIR USE

[75] Inventors: Friedrich Jonas, Aachen; Peter R. Schick; Jürgen Wiese, both of Krefeld, all of Fed. Rep. of Germany

[73] Assignee: Bayer Aktiensegellschaft, Leverkusen-Bayerwerk, Fed. Rep. of Germany

[21] Appl. No.: 223,383

[22] Filed: Jul. 25, 1988

[30] Foreign Application Priority Data

Aug. 6, 1987 [DE]  Fed. Rep. of Germany ....... 3726048

[51] Int. Cl.$^4$ ................................................. C09C 1/24
[52] U.S. Cl. ..................................... 106/413; 106/418; 106/439; 106/456
[58] Field of Search ............... 106/418, 439, 456, 413, 106/433, 434

[56] References Cited

U.S. PATENT DOCUMENTS 3,758,320  9/1973  Flores ................................. 106/413
4,753,680  6/1988  Burow ................................. 106/456

Primary Examiner—Peter D. Rosenberg
Attorney, Agent, or Firm—Connolly and Hutz

[57] ABSTRACT

Improved iron oxide pigments useful in the manufacture of magnetic recording carriers or for coloring inorganic or organic materials are iron oxide pigments having an iron (II) content of at least 5% by weight calculated as FeO after-treated with a phenolic compounds of the formula

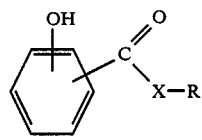

wherein
X is O or NH$_a$ and
R is straight chained or branched alkyl with 1 to 30 carbon atoms, alkenyl with 2 to 30 carbon atoms, cycloalkyl with 5 to 12 carbon atoms, or hydrogen.

10 Claims, No Drawings

THERMOSTABLE IRON OXIDE PIGMENTS, PROCESSES FOR THEIR PREPARATION AND THEIR USE

The present invention relates to iron oxide pigments having an iron(II) content of at least 5% by weight with a coating for increasing the thermostability, processes for the preparation of these pigments, and their use.

BACKGROUND OF THE INVENTION

Iron oxide pigments which contain iron at the +2 oxidation stage are thermodynamically unstable phases compared with iron(III) oxide $Fe_2O_3$. They may be partly or completely oxidized in the presence of air or oxygen, e.g. as follows:

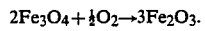

$$2Fe_3O_4 + \tfrac{1}{2}O_2 \rightarrow 3Fe_2O_3.$$

Such reactions are known to take place, for example, in iron oxide black pigments which corresponds to magnetite in their composition and structure. Oxidation deprives the pigment of its most important property, namely its color and the pigment therefore becomes unusable. The tendency to oxidation naturally increases with the degree of fineness of subdivision and hence specific surface area of the pigments.

The same applies to mixtures of iron oxide black and other iron oxide color pigments such as iron oxide red or iron oxide yellow, which are produced for brown color shades.

Whereas in color pigments it is the loss of color properties which renders them unusable, in magnetic pigments containing iron (II) it is the loss of magnetic properties, which is also caused by oxidation. Particularly at risk are the finely divided magnetite pigments and mixed phases of magnetite ($Fe_3O_4$) and maghaemite ($\gamma$-$Fe_2O_3$) which have a high iron(II)content. Mixed phases of magnetite and maghaemite and/or ferrites such as cobalt ferrites and magnetic pigments which are composed of a core of $Fe_3O_4$ or an iron oxide in a state of oxidation between that of $Fe_3O_4$ and $\gamma$-$Fe_2O_3$ and a sheath of magnetic metal oxides surrounding this core, in particular a sheath of iron and cobalt, are also sensitive to oxidation. In the technical literature on this subject, the term "bertholloids" is found for the compositions described here as well as the term "mixed phase".

It already been attempted to reduce the sensitivity to oxidation of finely divided ferrimagnetic magnetite pigments by a treatment with heterocyclic organic compounds (German 2,744,598).

After after-treatment with compounds containing boron is provided in German 3,211,327.

One disadvantage of such after-treated pigments is that they are frequently incompatible with the binders conventionally used.

It is therefore an object of the present invention to provide a way of improving the thermal stability of iron oxide pigments containing iron(II) in the presence of air or other gases containing oxygen or oxygen itself. At the same time, the pigment should also be free from the other disadvantages of pimgents known in the art.

BRIEF DESCRIPTION OF THE INVENTION

The thermal stability of iron oxide pigments containing iron(II) is improved to an excellent degree by treating iron oxide pigments containing iron(II) with certain hydroxybenzoic acid esters or amides.

DETAILED DESCRIPTION

It has now surprisingly been found that the stabilization requirments can be fulfilled to an excellent degree by iron oxide pigments which have an iron(II) content of at least 5 % by weight, calculated as FeO, which are after-treated with a substance corresponding to the following general formula

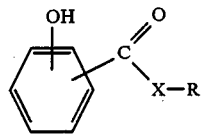

wherein
X=0 or NH and
R=an optionally substituted straight chained or branched alkyl or alkylene group having 1 to 30 carbon atoms , alkenyl having 2 to 30 carbon atoms, or an optionally substituted cycloalkyl group having 5 to 12 carbon atoms or an optionally substituted aryl group having 5 to 10 carbon atoms or hydrogen.

These iron oxide pigments are a subject of the present invention.

Particularly preferred are those iron oxide pigments according to the invention in which the after-treatment substance corresponds to the following general formula

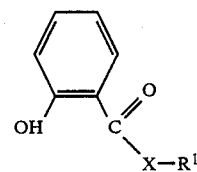

wherein
X=0 or NH and
$R^1$ denotes a straight chained or branched alkyl group with 1 to 30 carbon atoms.

Particularly advantageous results, also with regard to the availability of such iron oxide pigments, are obtained with after-treatment substances in which $R^1$=—$(CH_2)_n$—$CH_3$ wherein $0 \leq n \leq =24$ or —$CH_2$—$CH$ =$Ch_2$ or —$CH(CH_3)_2$ or 2-ethylhexyl.

Salicylic acid esters (X =O) containing aliphatic alcohol components with 2 to 18 carbon atoms are particularly preferred, e.g. octyl salicylate and dodecyl salicylate.

In the context of this invention, the after-treated iron oxide pigments are magnetite or mixed phases of magnetite with maghaemite (bertholloid iron oxides) and ferrites.

In addition to the stabilization described above of these iron oxide pigments against changes in temperature, the dispersibility of these pigments is also improved, which is highly advantageous for carrying out processes in dispersions of paints and magnetic lacquers.

These advantages according to the invention are achieved particularly if the quantity of after-treatment substance is from 0.1 to 10% by weight, based on the quantity of iron oxide pigment.

The present invention also relates to a process for the preparation of the pigments according to the invention. In one embodiment of the process according to the invention, the after-treatment substances are added to the iron oxides as homogeneous solutions. This may be achieved by dissolving the after-treatment substance in a suitable solvent and then adding the iron oxide pigment with stirring. The resulting coated iron oxide pigment is isolated from the suspension, e.g. by suction filtration or by evaporation of the solvent in a spray drier.

In suitable mixing apparatus, the after-treatment substances may also be applied from aqueous dispersion or in the dry state. Suitable procedures include e.g. air jet grinding, steam jet grinding and wet grinding.

One embodiment of the process according to the invention thus consists in that the after-treatment substances are provided as suspensions. In another embodiment, the after-treatment substances may be mixed in the dry state with the iron oxide to be stabilized, using a suitable grinding or mixing apparatus.

The after-treatment substances according to the invention are used in quantities of from 0.1 to 10% by weight, based on the iron oxide pigment to be stabilized. The quantities should as far as possible be optimized so that they correspond to the quantity which is absorbed on the iron oxide pigment in the state of equilibrium.

The present invention also relates to the use of the iron oxide pigments according to the invention for the production of magnetic recording carries or for coloring inorganic and/or organic materials.

The invention is illustrated below by way of example which should not be regarded as a limitation.

EXAMPLE 1

12 g of Methyl salicylate are dissolved in 1000 g of n-heptane. 400 g of Pigment 2 are added under conditions of dispersion with an Ultraturrax and dispersion is continued for a further 30 minutes. The suspension is kept at room temperature for 6 hours with stirring. The treated pigment is then filtered by suction through a vacuum filter, washed with n-heptane and dried in a vacuum at 40° C.

Examples 2-9 differ only in that the pigment (Pigment 1 or Pigment 2), the after-treatment substance used (a, b, c, d or e), the quantity thereof provided, the treatment temperature T and the solvent are varied, exactly as indicated in Table 2.

TABLE 1

Characterisation of the magnetic iron oxides (magnetites) used in the Examples

|  | Pigment 1* | Pigment 2* |
| --- | --- | --- |
| Particle length [μm] | 0.35 | 0.3 |
| Length/width ratio | 9:1 | 10:1 |
| BET surface area [m²/g] | 27 | 27 |
| Oil absorption [g/100 g] DIN | 50 | 42 |
| Coercivity [Oe] | 440 | 635 |
| Type of pigment | 1 | 2 |
| $Fe^{2+}$ content [%] | 24 | 14.5 |

*Pigment 1: Bayferrox ® AC 5111 M Trade product of Bayer AG (magnetite)
*Pigment 2: Bayferrox ® AC 5127 M Trade product of Bayer AG (cobalt epitaxial coated magnetite)

TABLE 2

| Example | Temp. [°C.] | Pigment | After-treatment substance Type | Quantity [g/100 g of pigment] | solvent | $Fe^{2+}$ content[1] after 1 h 150° C. air [%] |
| --- | --- | --- | --- | --- | --- | --- |
| Blank sample | | 1 | — | — | | 0.6 |
| blank sample | | 2 | — | — | | 2 |
| 1 | 25 | 2 | A | 3 | n-heptane | 13.1 |
| 2 | 50 | 2 | B | 3 | water | 13.1 |
| 3 | 25 | 2 | B | 6 | n-heptane | 13.2 |
| 4 | 25 | 2 | C | 3 | toluene | 13.1 |
| 5 | 60 | 2 | C | 3 | water | 13.3 |
| 6 | 25 | 2 | D | 3.5 | n-heptane | 13.8 |
| 7 | 25 | 2 | E | 3.5 | ethanol | 12.0 |
| 8 | 25 | 1 | B | 5 | toluene | 21 |
| 9 | 60 | 1 | B | 5 | water/ethanol 1:1 | 20 |

The after-treatment substances a - e used correspond to the formulae shown in Table 3.

1. The highly effective stabilizing action of the after-treatment substances according to the invention is demonstrated by the different $Fe^{2+}$ contents of the stabilized and non-stabilized pigment samples after exposure to different temperatures.

TABLE 3

After-treatment substances used:

A = 2-hydroxybenzoic acid methyl ester (methyl salicylate: OH and COOCH₃ on benzene ring)

B = 2-hydroxybenzoic acid dodecyl ester (OH and COOC₁₂H₂₅ on benzene ring)

C = 2-hydroxy-N-dodecylbenzamide (OH and C(=O)—NHC₁₂H₂₅ on benzene ring)

D = phenyl 2-hydroxybenzoate (OH and COO-phenyl on benzene ring)

E = 4-hydroxybenzoic acid methyl ester (HO and COOCH₃ on benzene ring, para)

The magnetites which have been after-treated according to the invention and cobalt epitaxially coated magnetites were used for the production of magnetic recording carriers after exposure to certain temperatures and were then compared with corresponding magnetites which were not after-treated but used for the production of recording carriers after the same exposure to temperatures.

PRODUCTION OF MULLER TAPES 1 g of magnetic pigment was mixed with 1.5 ml of a 25% solution of vinylite (VAG) in dimethylformamide by means of a spatula on a muller and the mixture was dispersed under a pressure of 6 kg as follows:

Twice a cycle of 25 revolutions, once a cycle of 50 revolutions and once a cycle of 100 revolutions. A further 1.5 ml of the binder solution are then added and a further cycle of 25 revolutions is carried out. The material is applied to a polyester film by means of a doctor blade of 60 μ. The tape is measured after the lacquer has dried.

TABLE 4

| | Results of testing tape | |
|---|---|---|
| Pigment | IHc [Oe] | 150° C. before production of the tape [min] |
| Blank samples | 660 | 0 |
| Blank samples | 640 | 30 |
| Blank samples | 630 | 60 |
| Blank samples | 621 | 90 |
| Example 3 | 663 | 30 |
| Example 3 | 665 | 60 |
| Example 3 | 664 | 90 |

The Table shows that a marked drop in coercivity occurs in the pigment samples which have not been stabilized.

What is claimed is:

1. Iron oxide pigments having an iron (II) content of at least 5% by weight calculated as FeO which have been treated with a phenolic compound of the formula

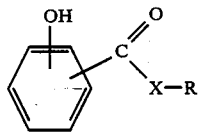

wherein
X is O or NH, and
R is straight chained or branched alkyl with 1 to 30 carbon atoms, alkenyl with 2 to 30 carbon atoms, cycloalkyl with 5 to 12 carbon atoms, or hydrogen.

2. Iron oxide pigments according to claim 1 wherein the phenolic compound has the formula

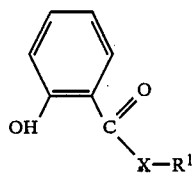

wherein
X is O or NH, and
$R^1$ is a straight chained or branched alkyl with 1 to 30 carbon atoms or alkenyl with 2 to 30 carbon atoms.

3. Iron oxide pigments according to claim 2 wherein $R^1$ is —$(CH_2)_n$—$CH_3$ with n being up to 24,
—$CH_2$—CH =$CH_2$,
—$CH(CH_3)_2$, or
—2-ethylhexyl.

4. Iron oxide pigments according to claim 1 wherein the iron oxide pigments are (i) magnetite or (ii) mixed phases of magnetite with maghaemite, or bertholloid iron oxides, and ferrites.

5. Iron oxides according to claim 1 wherein the quantity of said phenolic compound is from 0.1 to 10% by weight, based on the iron oxide pigment.

6. Process for the preparation of iron oxides according to claim 1 wherein said phenolic compounds are added as homogeneous solutions to the iron oxides.

7. Process for the preparation of the iron oxides according to claim 1 wherein said phenolic compounds are added as suspensions to the iron oxides.

8. Process for the preparation of the iron oxides according to claim 1 wherein said phenolic compound is mixed in the dry state with iron oxides to be stabilized in a grinding or mixing apparatus.

9. In an improved magnetic recording carriers containing iron oxide pigments, the improvement comprises said iron oxide pigment being the iron oxide pigment according to claim 1.

10. In an improved method of coloring inorganic or organic materials by adding a color-imparting pigment to said materials, the improvement comprises said pigment being the iron oxide pigment according to claim 1.

* * * * *